US011758455B2

(12) United States Patent
Anderson et al.

(10) Patent No.: US 11,758,455 B2
(45) Date of Patent: Sep. 12, 2023

(54) DISTRIBUTED UNIT (DU) FAILOVER TECHNIQUES FOR HIGH RELIABILITY VIRTUALIZED RADIO ACCESS NETWORK ARCHITECTURES

(71) Applicant: Cisco Technology, Inc., San Jose, CA (US)

(72) Inventors: Fred Jay Anderson, Lakeville, OH (US); Indermeet Singh Gandhi, San Jose, CA (US); Mark Grayson, Berkshire (GB); Shailender Potharaju, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 266 days.

(21) Appl. No.: 17/181,715

(22) Filed: Feb. 22, 2021

(65) Prior Publication Data

US 2022/0272594 A1 Aug. 25, 2022

(51) Int. Cl.
*H04W 36/10* (2009.01)
*H04W 36/16* (2009.01)

(52) U.S. Cl.
CPC ......... *H04W 36/10* (2013.01); *H04W 36/165* (2013.01)

(58) Field of Classification Search
CPC ..... H04W 36/32; H04W 36/30; H04W 36/12; H04L 41/0668; H04L 41/0816;
(Continued)

(56) References Cited

U.S. PATENT DOCUMENTS 10,797,968 B2 * 10/2020 Suthar ................. H04L 41/0893
2015/0195723 A1 7/2015 Park
(Continued)

FOREIGN PATENT DOCUMENTS

EP 3167578 B1 12/2018
IN 201741040628 A 11/2017
(Continued)

OTHER PUBLICATIONS

International Search Report and Written Opinion in counterpart International Application No. PCT/US2022/016395, dated May 17, 2022, 15 pages.
Antonio de la Oliva et al., "An overview of the CPRI specification and its application to C-RAN based LTE scenarios", IEEE Communications Magazine 54.2, Feb. 11, 2016, 7 pages.
O-RAN Alliance, "O-RAN Alliance Working Group 4 Management Plane Specification", O-RAN.WG4.MP.0-v04.00 Technical Specification, Jul. 2020, 184 pages.
(Continued)

*Primary Examiner* — David Q Nguyen
(74) *Attorney, Agent, or Firm* — Edell, Shapiro & Finnan, LLC

(57) ABSTRACT

Techniques presented herein may provide Distributed Unit (DU) failover techniques for a virtualized Radio Access Network (vRAN) architecture. In one example, a method may include maintaining, by a management node for a vRAN, service information for a plurality of distributed unit components for the vRAN in which the service information identifies, at least in part, service characteristics and failover rules for the vRAN. The method may further include determining a failure of a particular DU component of the plurality of DU components; and reassigning one or more particular RUs currently assigned to the particular DU component to one or more other DU components based on the service characteristics maintained in the service information and particular failover rules identified in the service information that are associated with each of the one or more particular RUs that are re-assigned.

20 Claims, 8 Drawing Sheets

(58) Field of Classification Search
CPC ......... H04L 41/12; H04L 45/02; H04L 45/64; H04L 45/54
USPC .............................. 370/328, 329, 330, 331
See application file for complete search history.

(56) References Cited

U.S. PATENT DOCUMENTS

| | | | |
|---|---|---|---|
| 2017/0353903 A1* | 12/2017 | Rost | H04W 36/10 |
| 2018/0077006 A1* | 3/2018 | Cui | H04L 41/40 |
| 2018/0343567 A1* | 11/2018 | Ashrafi | H04L 43/08 |
| 2018/0368204 A1 | 12/2018 | Park et al. | |
| 2019/0335366 A1* | 10/2019 | Jin | H04W 36/0033 |
| 2020/0204252 A1 | 6/2020 | Barbieri et al. | |
| 2020/0267576 A1 | 8/2020 | Bedekar et al. | |

FOREIGN PATENT DOCUMENTS

| | | |
|---|---|---|
| IN | 201741040628 A | 5/2019 |
| WO | 2018200570 A1 | 11/2018 |
| WO | 2020058772 A1 | 3/2020 |

OTHER PUBLICATIONS

O-RAN Alliance, "O-RAN Alliance Working Group 4 Management Plane Specification", O-RAN.WG4.MP.0-v03.00 Technical Specification, Apr. 2020, 178 pages.

Larry Samberg et al., "IEEE-1588 v2 (PTP)", MEF Reference Wiki, last modified Jul. 31, 2017, 6 pages.

IEEE Standards Association, "IEEE 1588-2008—IEEE Standard for a Precision Clock Synchronization Protocol for Networked Measurement and Control Systems", Jul. 24, 2008, 7 pages.

Line M. P. Larsen et al., "A Survey of the Functional Splits Proposed for 5G Mobile Crosshaul Networks", IEEE Communications Surveys and Tutorials, vol. 21, Issue 1, Oct. 2, 2018, 29 pages.

Cisco, "ITU-T Y.1731 Performance Monitoring in a Service Provider Network", Mar. 30, 2011, 6 pages.

Clark Chen et al., "Suggestions on Potential Solutions to C-RAN", NGMN Alliance, Version 4.0, Jan. 3, 2013, 41 pages.

"Common Public Radio Interface: eCPRI Interface Specification," eCPRI Specification V2.0, May 10, 2019, 109 pages.

* cited by examiner

|     | RU USAGE (CAPACITY) | TRAFFIC USAGE (CAPACITY) | SERVICE MANAGEMENT INFORMATION ||| FAILURE RULES/ACTIONS | FAILURE SLICE CONSIDERATIONS |
|     |     |     | LATENCY (PAIRED RUs) | LATENCY (OTHER RUs) | SLICE INFORMATION |     |     |
| --- | --- | --- | --- | --- | --- | --- | --- |
| DU 110 | 3 (8 RUs) | 1.4 Gbps (2.5 Gbps) | RU 111: 0.5ms<br>RU 112: 0.7ms<br>RU 113: 0.5ms | RU 121: 0.9ms<br>RU 122: 1.0ms<br>RU 123: 1.1ms<br>RU 131: 0.8ms<br>RU 132: 0.7ms | URLLC<br>eMBB | ACCEPT: RU 121, 131, 132 | 1) REHOME RUs WITH CLIENTS ON URLLC SLICE |
| DU 120 | 3 (8 RUs) | 1.8 Gbps (2.5 Gbps) | RU 121: 0.5ms<br>RU 122: 0.5ms<br>RU 123: 0.6ms | RU 111: 1.0ms<br>RU 112: 1.5ms<br>RU 113: 0.7ms<br>RU 131: 1.3ms<br>RU 132: 1.2ms | URLLC<br>eMBB<br>mMTC | ACCEPT: RU 113, | 2) REHOME RUs WITH CLIENTS ON eMBB SLICE |
| DU 130 | 2 (8 RUs) | 1.5 Gbps (2.5 Gbps) | RU 131: 0.3ms<br>RU 132: 0.4ms | RU 111: 0.6ms<br>RU 112: 0.7ms<br>RU 113: 1.1ms<br>RU 121: >1.5ms<br>RU 122: 0.8ms<br>RU 123: 1.0ms | URLLC<br>eMBB | ACCEPT: RU 111, 112, 122, 123 | 3) REHOME RUs WITH CLIENTS ON mMTC SLICE<br>4) REHOME RUs WITH NO CLIENTS |

FIG.1B

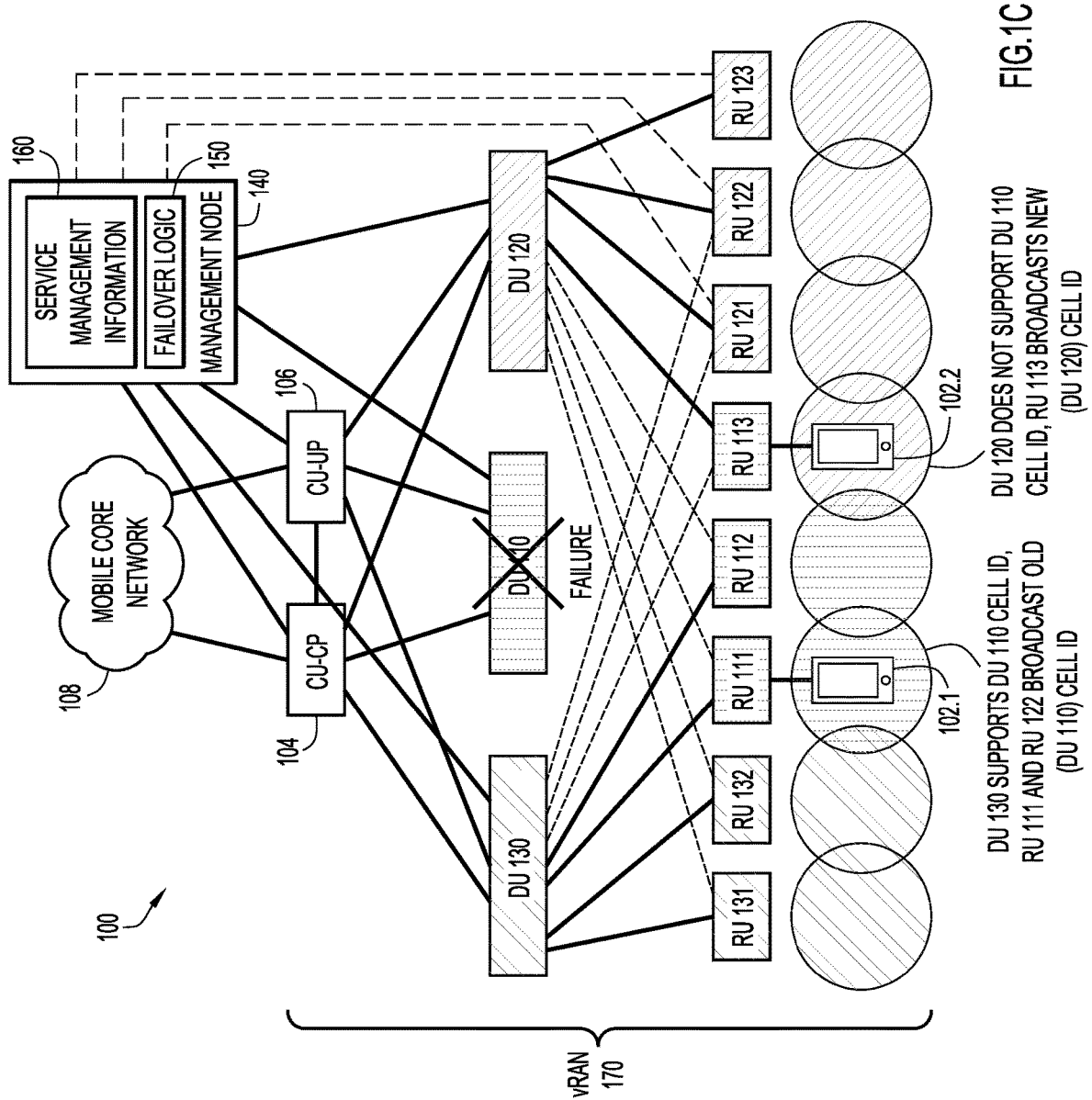

US 11,758,455 B2

DISTRIBUTED UNIT (DU) FAILOVER TECHNIQUES FOR HIGH RELIABILITY VIRTUALIZED RADIO ACCESS NETWORK ARCHITECTURES

TECHNICAL FIELD

The present disclosure relates to network equipment and services.

BACKGROUND

Networking architectures have grown increasingly complex in communications environments, particularly mobile networking environments. In particular, virtualized Radio Access Network (vRAN) architectures have been developed to provide radio coverage for mobile networks. However, there are significant challenges in providing failover mechanisms for elements of vRAN architectures.

BRIEF DESCRIPTION OF THE DRAWINGS

FIG. 1B is a table depictive service management information that may be maintained to facilitate DU failover techniques for the vRAN architecture of FIG. 1A, according to an example embodiment.

FIG. 1C is a diagram illustrating example details associated with DU failover techniques that may be implemented for the vRAN architecture of the system of FIG. 1A upon determining a failure of at least one DU, according to an example embodiment.

DESCRIPTION OF EXAMPLE EMBODIMENTS

Overview

Figure 1A:
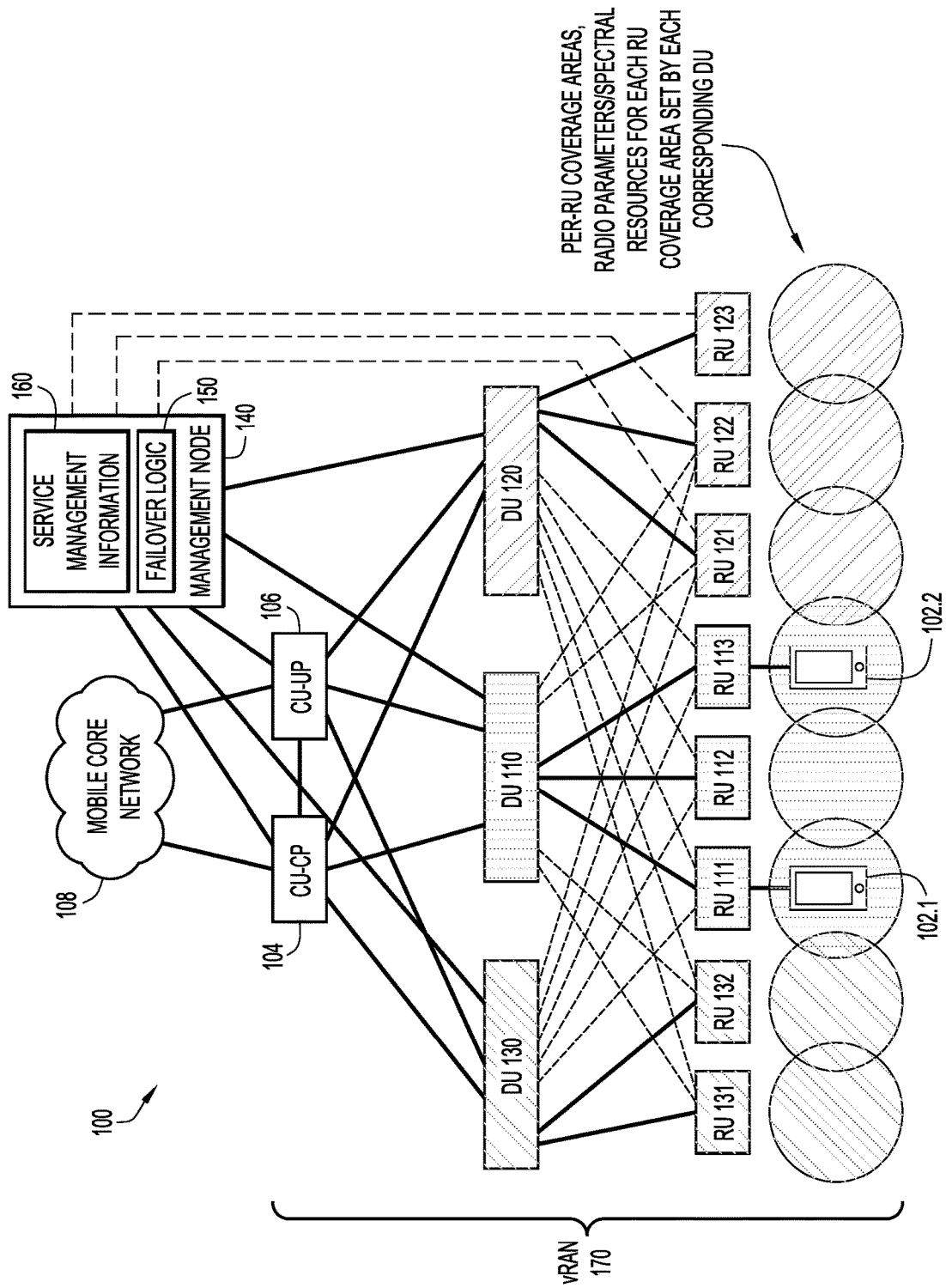
FIG. 1A is a diagram of a system in which Distributed Unit (DU) failover techniques may be implemented for a virtualized Radio Access Network (vRAN) architecture, according to an example embodiment.

Techniques presented herein may provide Distributed Unit (DU) failover techniques for a virtualized Radio Access Network (vRAN) architecture. In one example, a computer implemented method is provided that may include maintaining, by a management node for a vRAN, service information for a plurality of distributed unit components for the vRAN, wherein the service information identifies, at least in part, service characteristics and failover rules for the plurality of DU components in relation to a plurality of radio units (RUs) for the vRAN. The method may further include determining a failure of a particular DU component of the plurality of DU components, wherein one or more particular RUs are assigned to the particular DU component prior to the failure. The method may further include causing the one or more particular RUs to be reasssigned one or more other DU components of the plurality of DU components based on the service characteristics maintained in the service information and particular failover rules identified in the service information that are associated with each of the one or more particular RUs that are re-assigned.

Example Embodiments

As referred to herein, an 'enterprise' or 'enterprise entity' may be considered to be a business, government, educational institution, an organization, and/or the like that may include multiple enterprise locations (or sites), such as a main campus, remote branches, and so on. Enterprise devices (e.g., enterprise user equipment (UE), etc.) that may be owned, operated, and/or otherwise associated with an enterprise may be utilized by enterprise users to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications and/or authorizations, etc. for enterprise users associated with one or more UE, and/or the like).

Further as referred to herein, a wireless wide area (WWA) access network, such as a cellular/Third (3rd) Generation Partnership Project (3GPP) access networks, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG) access networks, and/or the like that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node is typically larger (sometimes orders of magnitude larger) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizens Broadband Radio Service (CBRS) access network and/or a 3GPP cellular (4G/LTE, 5G, nG, etc.) access network) may provide network connectivity/services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers (e.g., AT&T®, etc.), enterprises network operators/service providers (e.g., Cisco®, etc.), and/or third party network operators/service providers (e.g., neutral host network operators/service providers, cloud service providers, etc.). A private network may also be referred to as a standalone non-public network (SNPN) in some instances. Cisco is a registered trademark of Cisco Technology, Inc. AT&T is a registered trademark of AT&T Intellectual Property.

Discussed herein are features associated with vRAN architectures that may be provided for any combination of WWA and/or WLA accesses. In some instances, a vRAN architecture can be implemented as a disaggregated vRAN architecture that includes the split of a base station, such as a gNB, into a Central (or Centralized) Unit (CU), one or several Distributed Units (DUs), and one or several Radio Units (RUs). DUs may be referred to herein interchangeably as DU components and RUs may be referred to interchangeably as RU components. Further disaggregation may include separation of the CU into a Central Unit Control Plane (CU-CP) component and a Central Unit User Plane (CU-UP) component. In some instances, certain vRAN components may also be referred to as virtualized components (e.g., virtualized DU (vDU) components, and/or virtualized CU (vCU) components). For a vRAN architecture, one or more RU(s) can interface with a DU component, which further interfaces with a CU-CP component and a CU-UP component. For a disaggregated vRAN architecture, multiple DUs (each interfacing with corresponding RU(s)) can interface with a CU-CP component and a CU-UP component.

Disaggregated vRAN architectures are new concepts that are being considered for enterprise (e.g., private) deployments in order to provide solutions for various coverage and capacity use-cases. In a disaggregated, 5G vRAN, multiple components, such as RUs, DUs and CUs make up a functional system. In general, failures such as software crashes, hardware failures, etc. of RUs may be tolerated and managed through overlapping coverage areas provided via adjacent RUs, but a DU failure is more severe and can strand multiple RUs, leaving users without service. Techniques herein provide a unique DU failover mechanism which allow other DUs within the network to subscribe/re-assign the stranded RUs to non-failed DU(s) and resume service for the stranded RUs.

Referring to FIG. 1A, FIG. 1A is a block diagram of a system 100 in which DU failover techniques may be implemented for a virtualized Radio Access Network (vRAN) architecture, according to an example embodiment. System 100 includes a number of user equipment (UE) 102.1 and 102.2, a mobile core network 108, and a vRAN 170, which may be a disaggregated vRAN 170 including a CU-CP component 104 (also referred to as CU-CP 104), a CU-UP component 106 (also referred to as CU-UP 106), a first DU component 110 (also referred to as first DU 110), a second DU component 120 (also referred to as second DU 120), and a third DU component 130 (also referred to as third DU 130), a number of first RUs 111, 112, and 113 interfacing with/currently being served by the first DU 110, a number of second RUs 121, 122, and 123 interfacing with/currently being served by the second DU 120, and a number of third RUs 131 and 132 interfacing with/currently being served by the third DU 130. Also shown in system 100 is a management node 140 including failover logic 150 in which management node 140 is configured to maintain service management information 160.

Various example details for service management information 160 are discussed in further detail with reference to FIG. 1B, which is discussed in connection with example details discussed for FIGS. 1A and 1C. FIG. 1C a diagram illustrating example details associated with DU failover techniques that may be implemented for the vRAN architecture of the system of FIG. 1A upon failure of a particular DU, such as DU 110, according to an example embodiment.

Generally, vRAN 170, may be configured to provide 3GPP private 4G/LTE, 5G/nG, and/or CBRS mobile network services via first DU 110/first RUs 111, 112, and 113; second DU 120/second RUs 121, 122, and 123; and third DU 130/third RUs 131 and 132 to one or more UE, such as UE 102.1 and 102.2.

An RU, such as any of RUs 111, 112, 113, 121, 122, 123, 131, and 132, may terminate any combination of a WWA (e.g., cellular) and/or WLA (e.g., Wi-Fi®) air interface for any combination of Radio Access Technology (RAT) types (sometimes referred to more generally as 'accesses') for vRAN 170 such as, but not limited to: 3GPP licensed spectrum accesses (e.g., 3rd Generation (3G), 4G/LTE, 5G, and/or next Generation (nG) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, an RU may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more UE, such as any of UE 102.1 and 102.2, may utilize to connect to one or more RUs for one or more sessions (e.g., voice, video, data, gaming, combinations thereof, etc.). More generally, an RU may perform lower Physical (PHY) layer and RF operations to facilitate RF connections with one or more UE.

A DU (also sometimes referred to as a baseband unit) may provide lower level operations of the radio signal processing stack, such as Radio Link Control (RLC), Medium Access Control (MAC), and higher PHY layer operations, such as digital processing, including signal modulation, encoding, and scheduling, among others. A CU-UP may provide upper level operations of a radio signal processing stack, such as user plane Packet Data Convergence Protocol (PDCP) functions and user plane Service Data Adaptation Protocol (SDAP), among others. The split of operations of a radio signal processing stack among between a DU a CU-UP can be varied depending on implementation and/or configuration of a given vRAN/network architecture. Further, in addition to operations discussed for embodiments herein, a CU-CP, such as CU-CP 104, generally operates to control DU(s) and the CU-UP for a vRAN architecture, such as vRAN 170, via Radio Resource Control (RRC) functions and the control plane part of the PDCP protocol. In addition to radio signal processing operations, CU-CP/UP 104/106, DUs 110, 120, and 130, and RUs 111, 112, 113, 121, 122, 123, 131, and 132 may perform additional operations as discussed for various embodiments herein.

A UE, such as UE 102.1 and 102.2, may be associated with any user, subscriber, employee, client, customer, electronic device, etc. wishing to initiate a flow in system 100 and may be inclusive of any device that initiates a communication in system 100, such as a computer, an electronic device such as an industrial device, automation device, enterprise device, appliance, Internet of Things (IoT) device, etc., a laptop or electronic notebook, a WWA/WLA (cellular/Wi-Fi®) enabled telephone/smart phone, tablet, etc. and/or any other device, component, element, or object capable of initiating voice, audio, video, media, or data exchanges within system 100. It is to be understood that UEs discussed herein may also be configured with any combination of hardware (e.g., communications units, receiver(s), transmitter(s), transceiver(s), antenna(s) and/or antenna array(s), processor(s), memory element(s), baseband processor(s) (modems), etc.), controllers, software, logic, and/or any other elements/entities that may facilitate over-the-air RF connections with one or more access networks. The terms 'UE' and 'client' are used herein interchangeably.

Mobile core network 108 may be configured as any combination of a (private or non-private) 4G/LTE core, typically referred to as the Evolved Packet Core or System (EPC/EPS), 5G core or system (5GC/5GS), next Generation (nG) core or system (e.g., a Sixth Generation (6G) core/system, etc.), and/or the like as may be defined by 3GPP or other similar standards and may include any components, network elements, etc. in order to facilitate operations discussed herein. For example, in one instance for a 5G/nG mobile network core, the CU-CP 104 may interface with a 3GPP Access and Mobility Management Function (AMF) within the core and the CU-UP 106 may interface with one or more 3GPP User Plane Functions (UPFs) within the mobile core network 108.

As illustrated for FIG. 1A, each corresponding DU 110, 120, and 130 may have network connectivity with each corresponding RU 111, 112, 113, 121, 122, 123, 131, and 132 to enable various network/performance measurements to be performed between each DU and each RU, as discussed in further detail herein. Aside from network connectivity, each first RU 111, 112, and 113 is paired or assigned to first DU 110; each second RU 121, 122, and 123 is paired/assigned to second DU 120; and each third RU 131 and 132 is paired/assigned to third DU 130 in which each pairing/assignment is configured in order to facilitate data flow communications between each DU and the RUs served by each DU. Each of first DU 110, second DU 120, and third DU 130 further interface with CU-CP 104 via a corresponding F1-C interface and CU-UP 106 via a corresponding F1-U interface. Each of CU-CP 104 and CU-UP 106 further interface with each other via an E1 interface and with mobile core network 108.

Generally, connectivity between each DU and each RU may be referred to herein as 'fronthaul' connectivity, connectivity between each DU and the CU-CP/UP may be referred to herein as 'midhaul' connectivity, and connectivity between the CU-CP/UP and the mobile core network 108 may be referred to herein as 'backhaul' connectivity. It is to be understood, however, that the fronthaul, midhaul, and backhaul terms are provided for illustrative purposes only and are not meant to limit any of the broad features described herein. Generally, CU-UP to DU connectivity is provided as Internet Protocol (IP) connectivity, such as user plane General Packet Radio Service (GPRS) Tunneling Protocol (GTP-U) over IP, and CU-CP to DU connectivity is provided as IP connectivity, such as Stream Control Transmission Protocol (SCTP). In some instances, fronthaul user plane and control plane connectivity between each DU and each RU is facilitated via Common Public Radio Interface (CPRI) or enhanced CPRI (eCPRI) protocols. In some instances, fronthaul CPRI/eCPRI payloads (e.g., user and/or control plane payloads) between each DU and each RU may be transported over Ethernet or UDP/IP transports.

In one embodiment, as prescribed by Open Radio Access Network (O-RAN) Alliance Working Group 4 (WG4) Specification 'O-RAN.WG4.MP.0-v04.00' (referred to herein generally as the 'O-RAN WG4 Specification'), a 'processing element endpoint' can be configured on each RU 111, 112, 113, 121, 122, 123, 131, and 132 based on the DU to which each RU is assigned that includes transport-based identifiers that define local and remote endpoints that are to be used for specific data flows between each RU and the DU to which each RU is assigned. Stated differently, a 'processing element endpoint' is the O-RAN construct used to configure flows (that can be used for data flow transport, measurement operations, etc.) on the fronthaul interface between each RU and the DU with which each RU is assigned.

In various embodiments, a processing element endpoint configuration, depending on the transport type/network connectivity (e.g., Ethernet, IP, etc.) between each DU/RU, may identify any of: different (alias) Media Access Control (MAC) addresses, virtual local area network (VLAN) identity and MAC addresses; and/or User Datagram Protocol (UDP) ports and Internet Protocol (IP) addresses for the DU to which each RU is assigned. A particular processing element endpoint definition configured for a given RU/DU assignment can be provided a 'name' or other identifier that can be used by other systems, nodes, etc. (e.g., management node 140) to tie certain flows to DUs.

For the embodiment of FIG. 1A, consider that a corresponding initial/primary processing element endpoint is initially configured for each of RU 111, 112, and 113 based on an initial assignment/pairing of each RU 111, 112, and 113 to DU 110. Each initial/primary processing element endpoint configuration for each corresponding RU 111, 112, and 113 can be provided a unique name or identifier that uniquely identifies the initial/primary RU-DU pairing for each RU. The DU 110 is also configured with a corresponding processing element endpoint for each of RU 111, 112, and 113 to which it is initially paired for the embodiment of FIG. 1A in which the each processing element endpoint configuration for the DU 110 includes a unique name that uniquely identifies the initial/primary RU-DU pairing for each RU 111, 112, and 113. For example, for the RU 111 and DU 110 initial/primary assignment/pairing, an initial/primary processing element endpoint may be configured for both of RU 111 and DU 110 with a name, such as 'RU 111-DU 110 Primary Processing Element', or any other name that may be used to uniquely identify the RU 111 and DU 110 initial assignment/pairing that facilitates uplink/downlink packet communications between the RU 111 and the DU 110.

Processing element endpoint configuration names configured for RUs and a DU to which the RUs are paired for various assignments/pairings can use the same or different names between the RUs and the corresponding DU to which they are paired for a given configuration (e.g., primary or backup). For example, the DU 110 processing element endpoint configuration for the RU 111-DU 110 pairing could also be named 'RU 111-DU 110 Processing Element' or the like, so long as the DU 110 can identify its corresponding pairing with RU 111.

Further, for the RU 112 and DU 110 initial/primary assignment/pairing, a primary processing element endpoint an initial/primary processing element endpoint may be configured for both of RU 112 and DU 110 with a name, such as 'RU 112-DU 110 Primary Processing Element', or any other name that may be used to uniquely identify the RU 112 and DU 110 initial assignment/pairing that facilitates uplink/downlink packet communications between the RU 112 and the DU 110. Further, for the RU 113 and DU 110 initial/primary assignment/pairing, a primary processing element endpoint an initial/primary processing element endpoint may be configured for both of RU 113 and DU 110 with a name, such as 'RU 113-DU 110 Primary Processing Element', or any other name that may be used to uniquely identify the RU 113 and DU 110 initial assignment/pairing that facilitates uplink/downlink packet communications between the RU 113 and the DU 110.

Further for the embodiment of FIG. 1A, consider that a corresponding initial/primary processing element endpoint is configured for each of RU 121, 122, and 123 and for DU 120 based on an initial assignment/pairing of each RU 121,122, and 123 to DU 120 in which each initial/primary processing element endpoint configuration for each corresponding RU 121, 122, and 123 and for DU 120 can be provided a unique name or identifier that uniquely identifies the initial/primary RU-DU pairing for each RU (e.g., using a similar naming scheme as discussed above in which a unique name is provided for each assignment/pairing involving RU 121 and DU 120, RU 122 and DU 120, and RU 123 and DU 120). Further for the embodiment of FIG. 1A, consider that a corresponding initial/primary processing element endpoint is configured for each of RU 131 and 132 based on an initial assignment/pairing of each RU 131 and 132 to DU 130. in which each initial/primary processing element endpoint configuration for each corresponding RU 131 and 132 and for DU 130 can be provided a unique name or identifier that uniquely identifies the initial/primary RU-DU pairing for each RU (e.g., using a similar naming scheme as discussed above in which a unique name is provided for each assignment pairing involving RU 131 and DU 130 and also RU 132 and DU 130).

The coverage area of a radio node such as an eNB, gNB, RU, etc. is typically referred to as a 'cell' in which one or more UE may attach to the radio node (RU) that serves the coverage area/cell. Various per-RU coverages areas are illustrated in FIGS. 1A and 1C in which corresponding fill patterns [a vertical line pattern for DU 110/RUs 111, 112, and 113; a first diagonal line pattern for DU 120/RUs 121, 122, 123; and a second diagonal pattern for DU 130/RU 131 and 132] are provided for each cell coverage area based on the RU/DU pairing/assignment for corresponding DUs serving each cell. Radio parameters for each cell, such as the cell identifier (cell ID) broadcast by each RU, Sounding Reference Signal (SRS) configuration, Time Division Duplex (TDD) configuration, beamforming parameters, etc. and radio or spectral resources for each cell, such as Physical Resource Blocks (PRBs), communication frequencies, etc., are generally managed by the given DU serving each corresponding RU. In various embodiments, cell IDs can include Physical Cell Identifiers (PCIs), E-UTRAN Cell Global Identifiers (ECGIs), and/or New Radio Cell Global Identifiers (NR-CGIs or NCGIs).

In addition to radio parameters and radio resources, each DU and corresponding RU may provide services for one or more slice types. Generally, a 'slice' refers to a collection of one or more network functions that are organized/configured to provide one or more services. In relation to a vRAN architecture, vRAN components, such as DUs/RUs can be configured to manage radio resources, provide scheduling for uplink/downlink communications, manage interference, and/or the like in order to meet various criteria/configurations (e.g., performance guarantees, latency guarantees, etc.) for one or more slice types. Various slice types that may be served by one or more of DUs 110, 120, and 130 and their corresponding RUs may include, but not be limited to, a Ultra-Reliable Low-Latency Communication (URLLC) slice type, an enhanced mobile broadband (eMBB) slice type, and a massive machine-type communication (mMTC) slice type. Various slice considerations may be utilized for the DU failover techniques provided herein.

The initial assignment/pairing of each RU to each DU may be facilitated via management node 140. In one example, the initial assignment/pairing may be set based on any combination of latency, expected load, other service/performance characteristics, operator configuration, and/or the like. In accordance with embodiments herein, management node 140 may also, upon determining a failure of a given DU (e.g., any of DU 110, 120, and/or 130), facilitate reassignment of one or more RUs paired to the failed DU to one or more other (non-failed) DUs. In one embodiment, management node 140 may be implemented as an Operations, Administration, and Maintenance (OAM) node. In one embodiment, management node 140 may be implemented as an O-RAN network management system (NMS), as defined by the O-RAN Alliance. As illustrated in FIG. 1A, management node 140 may interface with CU-CP 104, CU-UP 106, and each DU 110, 120, and 130.

Management node 140 may also interface with each RU 111, 112, 113, 121, 122, 123, 131, and 132 through different mechanisms, depending on the deployment model for vRAN 170. For example, the O-RAN Alliance defines a hierarchical model in which management plane communications with an RU may be facilitated through the DU to which the RU is assigned/paired and a hybrid model in which management plane communications with an RU may be facilitated via an interface between the RU and a management node/system. Thus, management node 140 may interface with each RU 111, 112, 113, 121, 122, 123, 131, and 132 directly and/or indirectly for various operations discussed herein.

As noted above, failures such as software crashes, hardware failures, etc. of RUs may be tolerated and managed through overlapping coverage areas provided via adjacent RUs, but a DU failure is more severe and can strand multiple RUs, leaving users without service. Techniques herein provide a unique DU failover mechanism that allows other DUs within the network to subscribe/re-assign the stranded RUs to non-failed/active DU(s) and resume service for the stranded RUs.

Broadly, features provided by system 100 may include several components that may facilitate DU failover techniques to provide high reliability within vRAN 170. For example, during operation of system 100, in the Layer 3 (L3) control plane, management node 140, via failover logic 150, maintains service management information 160, which identifies a list of active DUs, along with statistics/measurement information indicating usage, capacity, and latency with each active DU 110, 120, and 130 and also each RU 111, 112, 113, 121, 122, 123, 131, and 132 served by each DU. Additionally, the service management information 160 identifies slice information indicating the slice types served by each DU/RU. Based on the measurement and slice information, a set of failover rules/actions can be created and updated during operation, along with constraint parameters for accommodation in some embodiments. Further, failover slice considerations can also be maintained for the service management information 160 such that the slice considerations indicate a preferential order for reassigning stranded RU(s) to the one or more other DU(s).

During operation, latency measurements can be performed for both DUs to which an RU is assigned and also for DUs to which RUs are not assigned. Latency measurements can be performed by DUs 110, 120, 130 and RUs 111, 112, 113, 121, 122, 123, 131, and 132 using latency measurement tools, such as Cisco® Fabric Latency tools or similar measurement tools that may be enabled by IEEE 1588v2 pPrecision Time Protocol (PTP), in which such measurement tools may be employed preemptively is employed preemptively to measure latency periodically from all RUs to each DU through the LAN fabric facilitating connectivity between each RU and each DU. In one embodiment, eCPRI message 5 can be utilized for determining latency. In one embodiment, latency measurements may be performed using Ethernet Delay Measurements (ETH-DM). The list of path latencies can be utilized to configure the failover rule/constraint parameters for service management information 160.

Referring to FIG. 1B, various information indicating measurement/slice information as well as failover rules/considerations that can maintained for service management information 160 in order to facilitate failover techniques for re-assigning one or more stranded RU(s) in the event that a DU failure is determined. RU usage information 161 is maintained for each active DU 110, 120, and 130 that indicates the current number of RUs assigned to each DU and the maximum capacity/number of RUs that can be assigned to each DU. For example, the RU usage for DU 110 indicates that 3 RUs (i.e., RU 111, 112, and 113) are currently assigned to DU 110 and the DU 110 has a maximum capacity of 8 RUs. Similar RU usage information 161 maintained for DUs 120 and 130 is also illustrated within service management information 160 in FIG. 1B.

Next, traffic data rate or usage information 162 is maintained for each active DU 110, 120, and 130 that indicates the current traffic usage (e.g., in Gigabits per second (Gbps)) and the maximum capacity that can be handled by each DU. For example, the current traffic usage for DU 110 indicates that 1.4 Gbps of traffic is currently being used for a maximum capacity of 2.5 Gbps for DU 110. Similar traffic usage information 162 maintained for DUs 120 and 130 is also illustrated within service management information 160 in FIG. 1B.

Additionally, latency information 163 is also maintained for each active DU 110, 120, and 130 that indicates the latency for each RU with which each DU is currently paired/assigned and that also indicates the latency for other RUs in system 100 with which each DU is not currently paired/assigned. For example, the latency between DU 110 and each of RU 111, 112 and 113 with which DU 110 is currently paired/assigned for the embodiment of FIG. 1A is indicated as: 0.5 milliseconds (ms) for the latency with RU 111; 0.7 ms for the latency with RU 112; and 0.5 ms for the latency with RU 113. Further, the latency between DU 110 and each of RU 121, 122, 123, 131 and 132 with which DU 110 is not currently paired/assigned for the embodiment of FIG. 1A is indicated as: 0.9 ms for the latency with RU 121; 1.0 ms for the latency with RU 122; 1.1 ms for the latency with RU 123; 0.8 ms for the latency with RU 131; and 0.7 ms for the latency with RU 132. Similar latency information 163 maintained for DUs 120 and 130 is also illustrated within service management information 160 in FIG. 1B.

In various embodiments, utilization values and/or latency values can be represented within service management information 160 as any combination of actual/measured values and/or ranges of values. For example, as illustrated for DU 130, the latency between DU 130 and RU 121 is represented a greater than (>) 1.5 ms. Thus, values, ranges, etc. may be represented in any format for service management information 160.

Further, slice information 164 indicating the slice(s) serviced by each DU 110, 120, and 130 is also maintained within service management information 160. For example, as illustrated in FIG. 1B, DU 110 is configured to service URLLC and eMBB slices, DU 120 is configured to service URLLC, eMBB, and mMTC slices, and DU 130 is configured to service URLLC and eMBB slices. In some embodiments, different types of slices may be indicated or identified using a corresponding slice type identifier or the like.

Although various utilization and latency information 161, 162, 163, and 164 is illustrated for service management information 160, it is to be understood that any types of measurement/information may be maintained by management node 140. For example, in some instances RU usage information 161 and traffic usage information 162 may be measured/represented as average usage (e.g., over a period of time), peak usage, usage in one or more traffic flow directions (e.g., uplink from RU to DU, downlink from DU to RU, uplink/downlink between each DU and CU-UP, etc.). In some instances, usage information 161, 162 and/or latency information 163 may include various constraint parameters for accommodation, such as limits or thresholds associated with usage/bandwidth, latency, jitter, or the like that may be expected between each DU and RU for any combination of one-way and/or round-trip latency, jitter, etc. For example, CPRI/eCPRI have strict latency, jitter, data rate requirements that are to be met for DU/RU user plane communications. Further, although units of Gbps for traffic usage values 162 and ms for latency values are illustrated in FIG. 1B, it is to be understood that the values may be represented using any appropriate units.

Based on the statistics, measurements, slice information, and/or constraint parameters maintained within the service management information 160, management node 140 via failover logic 150 configures failover actions or rules 165 that indicate which RUs are to be assigned to which DUs in the event that a failure is determined for one or more of DUs 110, 120, and 130. For the embodiment of FIG. 1A, consider that management node 140, via failover logic 150, considers the maximum capacity for RU usage and traffic usage as well as latency, and slice information as constraint parameters for configuring failover rules 165. In one example, it may be desirable to assign RU(s) to DU(s) based on a lowest measured RU-DU latency, the DU(s) being capable of handling clients on slice(s) served by the RU(s), and the reassignment of the RU(s) not causing capacity constraints for the DU(s) to be breached.

For example, as shown in FIG. 1B, consider that failover rules for DU 110 indicate that it is to accept RU 121 (in case of a failure of DU 120) and/or to accept RU 131 and RU 132 (in case of a failure over DU 130. Further as shown in FIG. 1B, consider that failover rules for DU 120 indicate that it is to accept RU 113 (in case of a failure of DU 110). Further as shown in FIG. 1B, consider that failover rules for DU 130 indicate that it is to accept RUs 111 and 112 (in case of a failure of DU 110) and/or to accept RUs 122 and 123 (in case of a failure of DU 120).

In some embodiments, initial failover rules 165 for one or more DUs/RUs can be configured once measurements/constraints/etc. are populated service management information 160 such that initial backup RU-DU pairs/assignments can be configured for one or more RUs of system 100. For example, a backup-pair processing element endpoint (also referred to herein interchangeably as a 'backup processing element endpoint') can be configured by the management node 140 for one or more RUs to indicate a backup DU to which each of the one or more RUs is to be reassigned following a failure of the DU to which the one or more RUs is currently assigned. A backup processing element endpoint configuration can be provided for each of an RU and corresponding backup DU assignment pairing in which the backup processing element endpoint configuration for the RU and DU can be provided a unique name or identifier that uniquely identifies the backup RU-DU pairing for each RU. For example, the naming for each backup RU-DU can follow a format similar to that as discussed above for the initial/primary RU-DU assignment pairing, such as 'RU XXX-DU YYY Backup Processing Element' (e.g., RU 111-DU 130 Backup Processing Element), or any other name/identifier that can uniquely identify the backup RU-DU assignment/pairing. In some embodiments, updated failover rules 165 for one or more DUs/RUs can also be re-configured upon determining updated measurements/etc. for service management information 160. Thus, any combination of initial and/or updated failover rules 165 can be configured for service management information 160 during operations of system 100.

Further provided for service management information 160 are failover slice considerations 166 that indicate an order for reassigning RUs to DUs for instances in which no backup-pair processing element endpoints are configured for one or more RUs for which a DU failure has occurred and/or for instances in which a previously configured backup-pair processing element endpoint configuration is no longer sufficient to meet certain constraint parameters (e.g., usage, latency, etc.) based on updated measurements obtained for one or more DU(s) and/or RU(s). The failover slice considerations are applicable to all RU/DU pairings for any DUs that may fail for any corresponding pairings.

Thus, in the case of a DU failure, the network management node 140 and CU-CP 104 layer can reassign RUs to available DUs based on utilization statistics/constraints, capacity information/constraints (e.g., peak usage, uplink (to switched network), etc.), latency information/constraints and failover slice considerations 166.

In one embodiment, the failover slice considerations 166 may involve identifying a failed DU and affected or 'orphaned' RUs, first selecting/reassigning RUs with clients (UEs) utilizing a URLLC slice, then selecting/reassigning RUs with clients utilizing an eMBB slice, then selecting/reassigning RUs with clients utilizing an mMTC slice, and finally selecting/reassigning RUs that are currently not serving any clients. In one example for the reassignment of each RU, the management node 140/failover logic 150 can match a target DU capable of supporting a given slice type served by a given RU and that meets any UE and/or RU count/usage/bandwidth and latency constraints in order to bound/reassign an initial or updated backup RU-DU pair by configuring the backup-pair processing element endpoint on the given RU, which pairs the affected RU to the target DU. In some instances, as discussed above, the backup-pair processing element endpoint configuration for one or more RU(s) can be updated during operation, for example, based on updated measurements, etc. obtained for one or more RU(s) and/or DU(s) for system 100. The management node 140/failover logic 150 also configures a new processing element endpoint for the target DU based on the updated RU-DU pairing.

The target DU can bring up a new cell for the affected RU that can either utilize the cell ID(s) of the failed DU to which the RU was previously assigned, thereby transmitting on the same radio, or the target DU can continue to use its existing cell ID(s) and spectral resources on the newly assigned RU.

After reassignment of 'orphaned' RUs to other DUs, the management node 140 and/or CU-CP/UP 104/106 can also throttle the user plane to each DU to which an RU was reassigned in order to accommodate the migrated connections and also limit oversubscription on the fronthaul connections and Layer 1 (L1)/Layer 2 (L2) compute processing demands for each DU. In one example, throttling may include throttling traffic for one or more UE(s) serviced by one or more reassigned RU(s) so as to not exceed the capacity of the DU to which the RU(s) are reassigned and/or limits of PRB reuse for scheduling. In one instance, assuming the 'orphaned' RU coverage areas do not overlap the existing RUs serviced by a given DU, the additional L2 scheduling may be a hybrid, best effort process that may be performed without incurring additional interference computations.

After 'orphaned' RU(s) are reassigned to a given DU, UEs served by the RU(s) can perform RRC establishment on a new cell over the same RU(s). Instead of releasing an RRC connection for the UEs, the CU-CP/UP 104/106 will keep the context for each UE and user sessions (radio bearers) at the PDCP layer will be suspended instead of released. Once a UE performs reestablishment with the new cell over the same RU, radio bearers are resumed over the new DU.

Since a DU may have a limited amount of processing (e.g., central processing unit (CPU)) resources and spectral resources, two options are envisioned regarding bringing up a new cell for a reassigned RU. A first option includes a new DU to which a given RU has been reassigned bringing up a new cell transmitting on the same radio spectrum as the failed DU along with matching slice descriptors. The RU broadcast cell ID(s) can now include the cell ID(s) of the failed DU. The first option may be utilized for instances in which the new DU can support the cell IDs/spectral resources of the failed DU. In the second option, UEs may have to share the same resources of the new/existing DU. In this case, high priority users or UEs on the higher priority slice of failed DU may be admitted first. If there is a contention, existing users with lower priority bearers may be pre-empted.

Consider an example as shown in FIG. 1C for system 100 in which DU 110 is determined to have failed. Based on the failure and the information and failover rules/slice considerations for service, RU 111 and RU 112 can be reassigned to backup DU 130 based on the corresponding backup processing element endpoint configurations provided for each of RU 111, RU 112 and DU 130 by management node 140/failover logic 150 and RU 113 can be reassigned to DU 120 based on the corresponding backup processing element endpoint configurations provided for each of RU 113 and DU 120. Following the reassignment, uplink/downlink communications can continue between each backup RU-DU pair or, in some instances, the backup pairings may be updated based on updated service management information maintained by management node 140/failover logic 150.

In one example for the embodiment of FIG. 1C, consider that DU 130 can support the radio parameters/resources (e.g., cell ID(s), spectral resources, etc.) of failed DU 110 but DU 120 cannot support the radio parameters/resources of failed DU 110. In this example, RU 111 and RU 112 may continue to broadcast the cell ID(s) of failed DU 110 (e.g., the vertical lines pattern for the coverage areas of RU 111 and RU 112 are unchanged from FIG. 1A to FIG. 1C), while RU 113 may broadcast the cell ID(s) of DU 120 (e.g., the vertical lines pattern for the coverage area of RU 113 of FIG. 1A is changed to the first diagonal lines pattern coverage area corresponding to DU 120 in FIG. 1C).

Accordingly, the DU failover techniques as described herein may provide an end result that preserves at least minimal connectivity to UE 102.1 and 102.2 while the DU 110 failure may be addressed and brought back on line by management node 140 and CU-CP/UP 104/106. Thus, no blackout zones in the network may be experienced during a DU failure and, in the best case where the network has sufficient capacity to absorb 'orphaned' UE(s) current traffic demands, no performance degradation may be experienced.

Figure 2A:
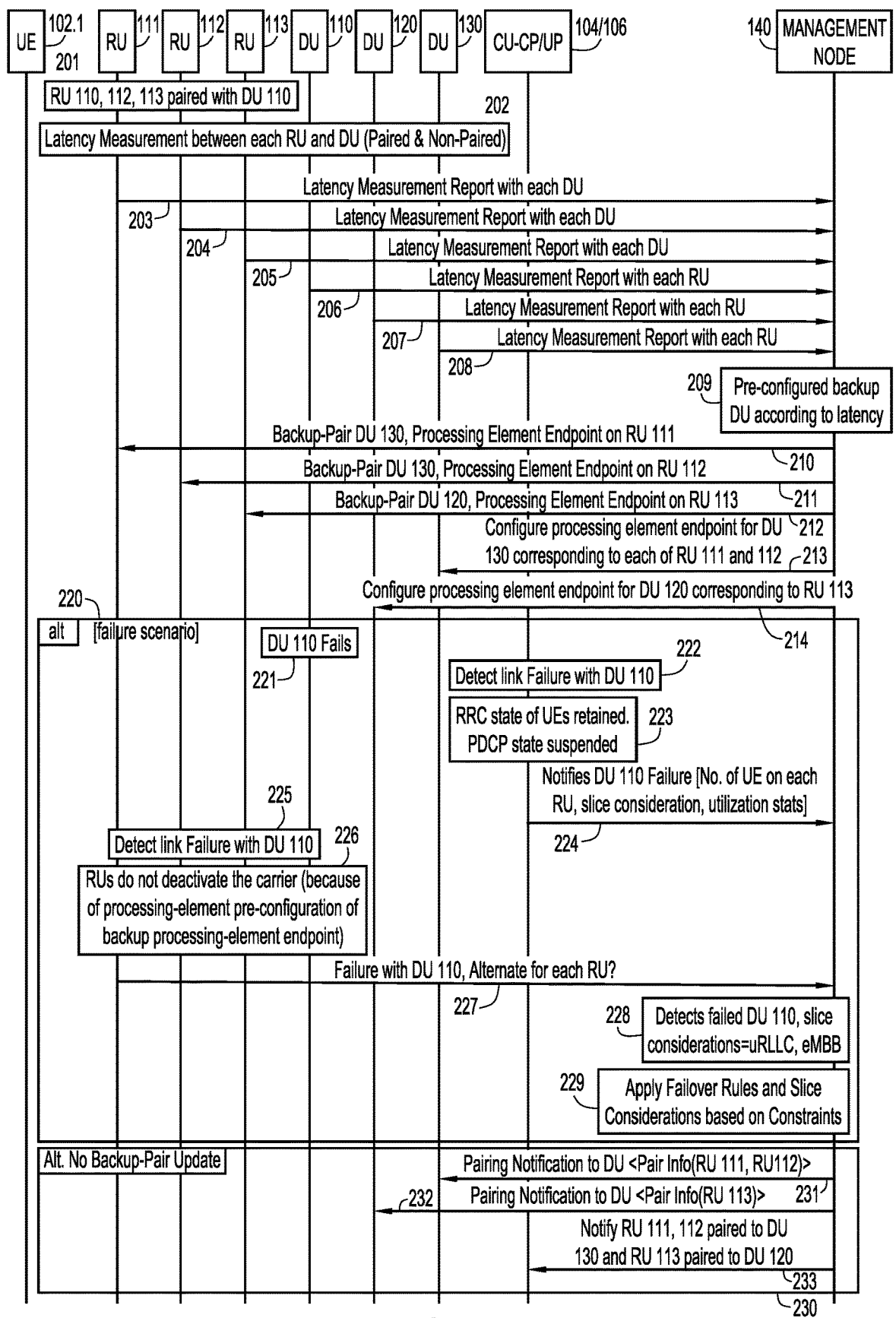
FIGS. 2A and 2B are a message sequence diagram illustrating a call flow associated with various DU failover techniques that may be implemented for the vRAN architecture of FIG. 1A, according to an example embodiment.
Figure 2B:
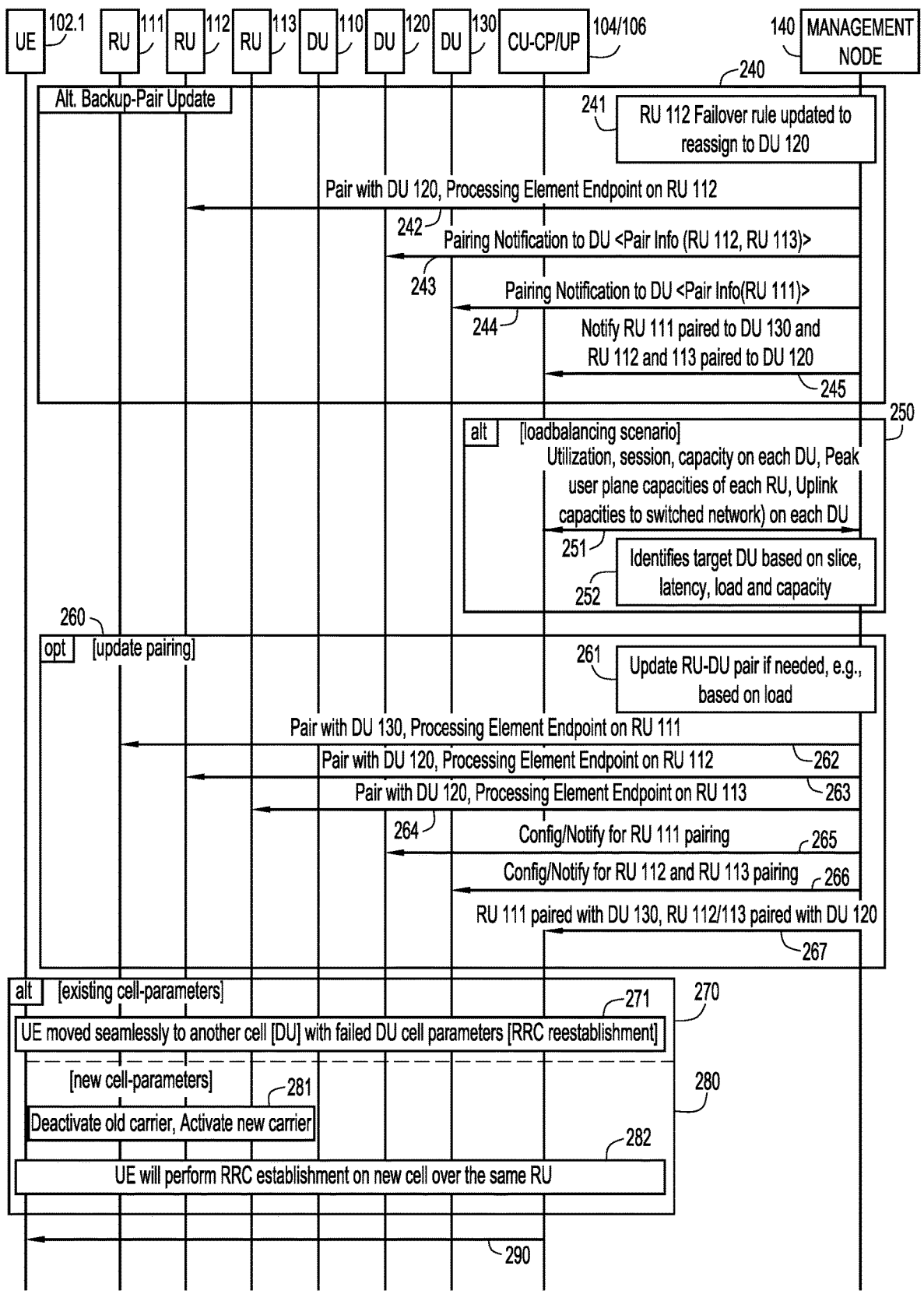

Additional operations that may be performed within system 100 are discussed with reference to FIGS. 2A and 2B in which FIGS. 2A and 2B are a message sequence diagram illustrating a call flow 200 associated with DU failover techniques that may be implemented for the vRAN architecture of FIG. 1A, according to an example embodiment. For purposes of example only, FIGS. 2A and 2B include UE 102.1, RU 111, RU 112, RU 113, DU 110, DU 120, DU 130, CU-CP/UP 104/106, and management node 140.

For example, consider at 201 that RU 111, 112, and 113 are paired with DU 110 such that a primary processing element endpoint is configured for each of RU 111, 112, and 113 corresponding to DU 110 and further a processing element endpoint is configured for DU 110 corresponding to each of RU 111, 112, and 113 (e.g. as discussed above for FIG. 1A). It is to be understood that processing element endpoints may also be configured for each of the other RUs and DUs of system 100 based on their corresponding pairings (e.g., as discussed above for FIG. 1A).

At 202, consider that latency measurements are performed between each RU 111, 112, and 113 and each DU 110, 120, and 130. Usage statistics, etc. may also be gathered at 202. As discussed herein, latency measurements can be performed both between paired and non-paired RUs/DUs. At 203, RU 111 communicates a latency measurement report to management node 140 identifying the measured latency and/or any other statistics/measurements with each DU 110, 120, and 130. At 204, RU 112 communicates a latency measurement report to management node 140 identifying the measured latency and/or any other statistics/measurements with each DU 110, 120, and 130. At 205, RU 113 communicates a latency measurement report to management node 140 identifying the measured latency and/or any other statistics/measurements with each DU 110, 120, and 130.

At 206, DU 110 communicates a latency measurement report to management node 140 identifying the measured latency and/or any other statistics/measurements with each of RU 111, 112, and 113. At 207, DU 120 communicates a latency measurement report to management node 140 identifying the measured latency and/or any other statistics/ measurements with each of RU 111, 112, and 113. At 208, DU 130 communicates a latency measurement report to management node 140 identifying the measured latency and/or any other statistics/measurements with each of RU 111, 112, and 113.

It is to be understood that the latency measurement reports for each of DU 110, 120, and 130 may also include measured latency and/or any other statistics/measurements associated with other RUs (e.g., RU 121, 122, 122, 131, and 132). Further, it is also to be understood that the measurements at 202 and the reporting at 203, 204, 205, 206, 207, and 208 may be performed continuously, in a periodic or scheduled manner, based on detection of certain events (e.g., failure of a DU), and/or the like such that management node 140 may receive updated reporting from any DU and/or RU during operation of system 100.

At 209, the latency measurements and/or any other statistics/measurements are populated/stored via service management information 160 and, based on the measurement/ statistics and various constraint parameters, such as latency/ usage constraints, etc., management node 140 via failover logic 150 configures initial failover rules for the service management information 160. Consider, for example, that the initial failover rules identify that RU 111 and RU 112 are to be reassigned to DU 130 and that RU 113 is to be reassigned to DU 120 in the event of a failure of DU 110.

Based on the initial failover rules, a backup-pair processing element endpoint is configured by the management node 140/failover logic 150 on RU 111 for the initial backup pairing between RU 111 and DU 130, as shown at 210. Similarly, at 211, the management node 140/failover logic 150 configures a backup-pair processing element endpoint on RU 112 for the initial backup pairing between RU 112 and DU 130. Further, at 212, the management node 140/ failover logic 15 configures a backup-pair processing element endpoint on RU 113 for the initial backup pairing between RU 113 and DU 120.

At 213, management node 140/failover logic 150 configures each of a processing element endpoint for DU 130 corresponding to the initial backup pairing for each of RU 111 and RU 112. Further, at 214, management node 140/ failover logic 150 configures a processing element endpoint for DU 120 corresponding to the initial backup pairing for RU 113. The backup-pair processing element endpoint configurations for each of RU 111, 112, 113 and DU 120 and 130 can be provided unique names or identifiers to uniquely identify the corresponding backup RU-DU assignments/ pairings as discussed above for FIG. 1A, such as 'RU 111-DU 110 Primary Processing Element', 'RU 111-DU 130 Backup Processing Element', 'RU 112-DU 110 Primary Processing Element', 'RU 112-DU 130 Backup Processing Element', 'RU 113-DU 110 Primary Processing Element', and 'RU 113-DU 120 Backup Processing Element'.

Consider various operations that may be performed for a failure scenario 220 involving DU 110. For example, consider at 221 that DU 110 fails (e.g., experiences a hardware and/or software failure). At 222, CU-CP/UP 104/106 detects a link failure with DU 110. CU-CP/UP 104/106 can detect the link failure using any mechanisms now known or hereafter developed. At 223, the RRC state of the UE(s) served by DU 110, such as UE 102.1 as shown for the present example, is retained and the PDCP state of the UE(s) is suspended.

Thus, when the DU 110 fails, the CU-CP/UP 104/106 retains the RRC connection state for the UEs, moves PDCP processing for the UE session(s) handled by DU 110 (e.g., session for UE 102.1) into a suspended state, and continues to buffer the downlink (DL) PDCP PDUs for the UE(s), such as UE 102.1. The UE 102.1 will not be disconnected from the network but may experience a temporary radio synchronization loss. During the RRC re-establishment exchange for UE 102.1, as illustrated via one of the two options at 270 or 280 shown in FIG. 2B (discussed below), the CU-CP/UP 104/106 uses the old RRC context for UE 102.1 to establish the UE 102.1 session in the new DU to which the RU serving the UE 102.1 has been reassigned (e.g., DU 130 for a backup pairing between DU 130 and RU 111). Upon the RRC reestablishment, the PDCP PDUs can then be delivered to the UE 102.1. As a result, techniques herein may avoid any impact on user experience during a DU failure.

Returning to the operations for the failure scenario 220, at 224, the CU-CP/UP 104/106 notifies management node 140/failover logic 150 regarding the DU 110 failure and also identifies the number of UE(s) on each RU 111, 112, and 113, slice considerations (e.g., which RUs are serving UEs on which slices), and utilization statistics.

Consider at 225 that each RU 111, 112, and 113 detects a link failure with DU 110. As shown at 226, RUs 111, 112, and 113 do not deactivate their carriers; rather, because of their backup-pair processing element endpoint configurations, each of RU 111, 112, and 113 can be reassigned to their corresponding backup-pair DUs (e.g., RU 111 and 112 to DU 130 and RU 113 to DU 120).

In some embodiments, RUs (e.g., RU 111, 112, and 113) can include logic that can trigger the RUs to automatically switch from utilizing a primary processing element endpoint configuration to utilizing backup processing element endpoint configuration to facilitate reassignment to a backup DU upon detecting a link failure with a primary DU. Such embodiments may also involve notifications from the management node 140/failover logic 150 to the corresponding DUs to also utilize their corresponding backup processing element endpoint configurations to facilitate communications with each RU. The management node 140/failover logic 150 can also provide a notification to CU-CP/UP 104/106 involving any re-assignment/pairing changes.

In some embodiments, RUs (e.g., RU 111, 112, and 113) can include logic that can trigger the RUs to automatically update a backup-pair processing element endpoint configuration to be a new primary processing element endpoint configuration to facilitate reassignment to a backup DU upon detecting a link failure with a primary DU. In such embodiments, for example, RUs can perform such updating by changing the name of a backup-pair processing element endpoint configuration to identify a new primary processing element endpoint configuration. A RU that detects a link failure with its primary DU can update the name of the backup-pair processing element configuration to indicate a new primary processing element endpoint configuration with the backup DU to which it is to be paired. For example, in such an embodiment, RU 111 could automatically update its 'RU 111-DU 130 Backup Processing Element' to be named 'RU 111-DU 130 Primary Processing Element'. DU 130, upon obtaining a notification from the management node 140/failover logic 150 confirming the backup pairing can utilize its corresponding previously configured processing element for RU 111 (e.g., 'RU 111-DU 130 Backup Processing Element') to facilitate communications with RU 111. The management node 140/failover logic 150 can also provide a notification to CU-CP/UP 104/106 involving any re-assignment/pairing changes.

In some embodiments, RUs can include logic to automatically switch to utilizing their backup-pair processing element endpoint configurations until a link with a previously paired primary DU becomes available, at which time the RUs can switch back to utilizing a previously configured primary processing element endpoint configuration. Such embodiments may also involve notifications from the management node 140/failover logic 150 to the corresponding DUs to also utilize or not utilize corresponding processing element endpoint configurations and to the CU-UP/CP involving any pairing changes.

In still some embodiments, RUs may include logic (in addition to and/or in lieu of any automatic switching logic) that can cause the RUs to update their backup-pair processing element endpoint configuration to be a new primary processing element endpoint configuration or to switch to utilizing their backup-pair processing element endpoint configurations until a link with a previously paired primary DU becomes available, at which point the RUs can switch back to utilizing their primary processing element endpoint configuration. Such embodiments may also involve notifications from the management node 140/failover logic 150 to the corresponding DUs to also utilize or not utilize corresponding processing element endpoint configurations and to the CU-UP/CP involving any pairing changes.

Returning to the present example, each RU 111, 112, and 113 may also notify management node 140 regarding the failure of DU 110, as shown at 227, in order to determine an appropriate alternate DU for each RU, if, for example, the failover rule for each RU may have changed due to updated measurements, statistics, etc.

At 228, management node 140 via failover logic 150, based on the notifications from CU-CP/UP 104/106 and/or from each RU, detects the failure of DU 110 and determines slice considerations associated with DU 110, for example, that DU 110 and RUs 111, 112, and 113 may service UEs on URLLC and eMBB slices. At 229, management node 140 via failover logic 150 applies the failover rules and slice considerations based on various latency/usage constraints. Recall, that the measurements at 202 and the reporting at 203, 204, 205, 206, 207, and 208 may be performed continuously, in a periodic or scheduled manner, based on detection of certain events (e.g., failure of a DU), and/or the like such that management node 140 may receive updated reporting from any DU and/or RU during operation of system 100.

Thus, at 229, management node 140/failover logic 150 may determine either that no RU backup-pair processing element endpoint configuration updates may be needed regarding the reassignment of RUs 111, 112, and 113 to corresponding DUs 120 and 130 or that one or more RU 111, 112, and/or 113 update(s) may be needed.

For example, 230 illustrates operations for a scenario in which management node 140/failover logic 150 determines that no updates are needed regarding the reassignment of RUs 111, 112, and 113 based on the initial failover rules configured for service management information 160. In this scenario, at 231, the management node 140/failover logic 150 notifies DU 130 via a pairing notification with corresponding paring information indicating that RU 111 and RU 112 are reassigned/paired to DU 130 for the backup pairings in which DU 130 is to utilize each processing element endpoint configured for each RU (as configured at 213) for communications with the RU 111 and RU 112. Similarly, at 232, the management node 140/failover logic 150 notifies DU 120 via a pairing notification with corresponding pairing information indicating that RU 113 is reassigned/paired to DU 120 for the backup pairing in which DU 120 is to utilize the processing element endpoint configured for RU 113 (as configured at 214) for communications with RU 113.

For embodiments in which RUs 111 and RU 112 include logic to automatically switch to utilizing a backup-pair processing element configuration upon determining a link failure with primary DU 110, the notification to DU 130 at 231 can trigger the DU 130 to also use its corresponding backup-pair processing element configurations to facilitate uplink/downlink communications with each RU 111 and RU 112. Similarly, the notification to DU 120 at 231 may trigger the DU 120 can trigger the DU 120 to also use its corresponding backup-pair processing element configuration to facilitate uplink/downlink communications with RU 113 for such embodiments.

For embodiments in which RUs 111 and RU 112 include logic to update the naming of their backup-pair processing element configurations to reflect a 'Primary' configuration upon determining a link failure with primary DU 110, the notification to DU 130 at 231 may trigger DU 130 to use its corresponding backup-pair processing element configurations to facilitate uplink/downlink communications with each RU 111 and RU 112. The notification obtained by DU 120 at 232 may trigger similar operations for DU 120 involving communications with RU 113 based on the backup pairing with RU 113.

At 233, management node 140/failover logic 150 notifies CU-CP/UP 104/106 regarding the reassignment of RU 111 and 112 being paired to DU 130 and of RU 113 being paired to DU 120. Thus, the initial backup-pair processing element endpoint configuration for each of RU 111, 112, and 113 (with any appropriate name changes that may be utilized to switch from a backup configuration name to a primary configuration name, in some embodiments), as well as the processing element endpoint configuration for each of DU 120 (for the backup pairing with RU 113) and DU 130 (for the backup pairing with RU 111 and RU 112) can be utilized as illustrated for the scenario 230 to facilitate uplink/downlink communications between the backup RU/DU pairs.

Thereafter, as shown via operations 270 and 280, RRC for UE 102.1 is reestablished using either the first option or the second option discussed herein. For the first option, as shown at 270, the existing cell parameters for a given reassigned RU, such as RU 111 and 112, and UE 102.1 is moved seamlessly to another cell (another DU) using the failed DU 110 cell parameters (e.g., cell ID) to facilitate RRC reestablishment for UE 102.1, as shown at 271. For the second option, as shown at 280, the old carrier for a given RU, such as for RU 113, can be deactivated and reactivated using a new carrier (e.g., new radio parameters/resources) for DU 120, as shown at 281. Thereafter, a UE, such as UE 102.2 (not shown in FIGS. 2A and 2B) can perform RRC establishment on the new cell over the same RU 113, as shown at 282. Once the RRC reestablishment/establishment is performed for a given UE, such as UE 102.1 as shown in FIG. 2B, buffered downlink PDCP PDUs for the UE can be delivered to the UE via the CU-UP 106 and DU-RU configuration, as shown at 290.

Turning again to FIG. 2B, other example details are illustrated in FIG. 2B. In another example scenario, as shown at 240 of FIG. 2A, management node 140/failover logic 150 may determine that one or more previously configured backup-pair processing element endpoint configuration(s) are to be updated for one or more of RU(s) 111, 112, and/or RU 113. For example, a pairing may be updated based on updated measurement information and/or utilization information, statistics, etc. that may be obtained from any RU, DU, and/or the CU-CP/UP. For the operations for scenario 240, consider at 226 that the RUs 111, 112, and 113 include logic corresponding to the embodiment in which the RUs automatically update their backup-pair processing element endpoint configuration name to reflect a new primary processing element endpoint configuration name upon detecting a link failure with DU 110 at 225.

Consider, in one example as shown at 241, that management node 140/failover logic 150 determines that the RU 112 failover rule is to be updated. Thus, in the scenario 240, management node 140/failover logic may reconfigure the new primary processing element endpoint configuration for RU 112 to be reassigned to DU 120, as shown at 242, with a name, such as 'RU 112-DU 120 Primary Processing Element'.

Recall, as discussed above at 214 that DU 120 was previously configured with a backup-pair processing element endpoint for the backup pairing with RU 113 and, at 213, DU 130 was previously configured with a backup-pair processing element endpoint for the backup pairing with RU 111. Since the failover rules for each of RU 111 and RU 113 are assumed not to have changed for the scenario 240, the DU processing element endpoint configurations for these RUs may be utilized without further changes.

Accordingly, in the scenario 240, management node 140/failover logic notifies DU 120 that RU 112 and RU 113 are paired to DU 120 in which the pairing notification with regard to RU 112 may facilitate configuring a processing element for DU 120, as shown at 243. Further, at 244, management node 140/failover logic 150 notifies DU 130 that RU 111 is paired to DU 130. At 245, management node 140/failover logic 150 notifies CU-CP/UP 104/106 regarding the reassignment of RU 111 being paired to DU 130 and of RU 112 and RU 113 being paired to DU 120. Thereafter, RRC reestablishment can be performed for the UE utilizing the various options 270, 280 as discussed above and the buffered downlink PDCP PDUs can be delivered to the UE, as shown at 290.

Consider another example involving a load balancing scenario as shown at 250 (that can be performed before and/or after any DU failovers) in which updated utilization information, session information, capacity information (e.g., peak user plane capacity, uplink capacity to the DU-CU switched network), and/or the like for one or more of DU 110 (e.g., assuming DU 110 is brought back online following the failure at 22), DU 120, and/or DU 130 can be communicated to management node 140/failover logic 150, as shown at 251. Based on the updated information, management logic 140/failover logic 150 may identify updated target DU(s) to which one or more RU(s) are to be reassigned based on the various slice, latency, load, capacity, etc. information/constraints discussed for various embodiments herein. In this scenario, any combination of RU-DU pairings and/or failover rules can be updated and implemented for the vRAN 170 utilizing any of the updating techniques discussed herein.

For example, in another updated pairing scenario 260 as shown in FIG. 2B, management node 140/failover logic 150 may determine that one or more RU-DU primary assignments/pairs may be updated, as shown at 261. For example, updated latency, capacity, load information, etc. may trigger management node 140/failover logic 150 to update one or more RU-DU primary assignments/pairs (before and/or after any DU failovers). Upon determining such an update, respective operations 262, 263, and 264 may be performed, as discussed herein, in order to update the processing element endpoints for each of RU 111, 112, and 113, respectively. For example, RU 111 may be paired with DU 120, RU 112 may be paired with DU 130, and RU 113 may be paired with DU 130 based on the updated information. Thereafter, at 265, the management node 140/failover logic 150 can configure a primary processing element endpoint configuration for DU 120 for the RU 111 pairing and notify the DU 120 that it is paired to RU 111 via a pairing notification. At 266, the management node 140/failover logic 150 can configure a corresponding primary processing element endpoint configuration for each of the RU 112 pairing with DU 130 and the RU 113 pairing with DU 130 and notify the DU 130 that it is paired to RU 112 and RU 113 via a pairing notification. Further, the CU-CP/UP 104/106 can be notified of the updated pairings, as shown at 267. Thus, as shown for scenario 260, new primary processing element endpoint configurations can be provided at RUs for a vRAN based on various conditions (e.g., load, etc.).

Accordingly, techniques herein provide a failover mechanism in which the CU-CP/UP 104/106 is able to detect the failure of a DU, such as DU 110, and retains the RRC/PDCP Protocol Data Units (PDUs) for UE served by the DU, such as UE 102.1 shown in FIGS. 2A and 2B. Further, the management node 140/failover logic 150 can be triggered to assign the orphan RUs 111, 112, and 113 to the target DUs 120 and 130 according to the failover rules configured and/or updated for service management information 160. Thus, UE experience may not suffer as UEs are able to reestablish the RRC with a newly assigned DU. Further, techniques herein provide for updating any failover rules, backup pairings, and/or primary parings based on updated information obtained from vRAN 170.

Figure 3:
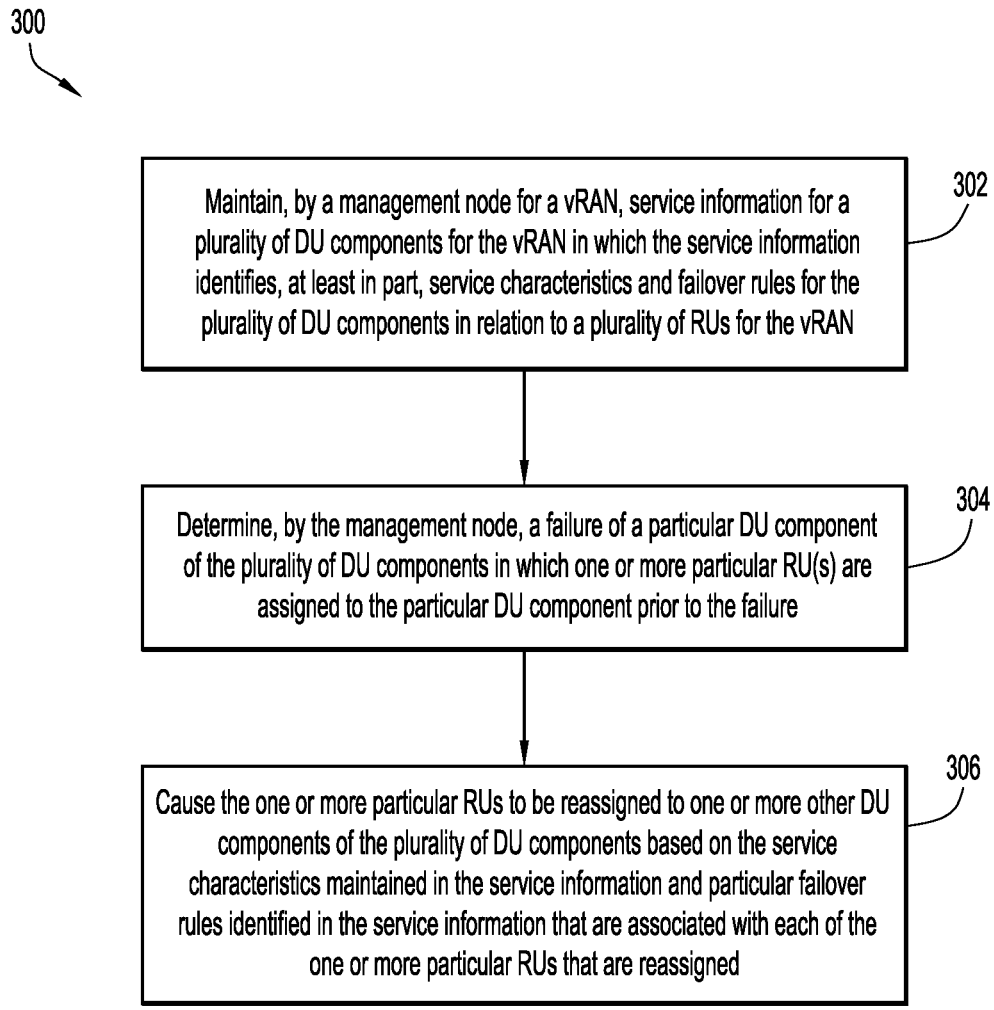
FIG. 3 is a flow chart depicting a method according to an example embodiment.

Referring to FIG. 3, FIG. 3 is a flow chart depicting a method 300 according to an example embodiment. For example, method 300 illustrates example operations that may be performed by a management node/failover logic, such as management node 140/failover logic 150, to facilitate DU failover techniques as discussed herein, according to an example embodiment.

At 302, the method may include maintaining, by a management node for a vRAN (e.g., management node 140), service information for a plurality of DU components (e.g., DUs 110, 120, and 130) for the vRAN. The service information may identify, at least in part, service characteristics and failover rules for the plurality of DU components in relation to a plurality of RUs for the vRAN (e.g., RUs 111, 112, 113, 121, 122, 123, 131, and 132). In various embodiments, the service characteristics may include RU usage/capacity information per DU, traffic usage/capacity information per DU (e.g., average capacity, peak capacity, uplink/downlink capacity, etc.), latency information for one or more RU(s) with which a DU is currently paired/serving, latency information for one or more other RU(s) with which a DU is not currently paired/serving, and/or the like. In some instances, the service characteristics may also identify one or more slices served by a given DU.

In at least one embodiment, the failover rules for a given DU component may identify one or more RU(s) that are to be reassigned to the given DU component based on determining a failure of a current DU component with which each of the one or more RU(s) is currently assigned. In at least one embodiment, the service information may further identify slice considerations indicating an order for reassigning one or more RUs to one or more other DU components.

At 304, the method may include determining, by the management node, a failure of a particular DU component of the plurality of DU components in which one or more particular RU(s) are assigned to the particular DU component prior to the failure.

At 306, the method may include causing the one or more particular RUs to be reassigned to one or more other distributed unit components of the plurality of DU components based on the service characteristics maintained in the service information and particular failover rules identified in the service information that are associated with each of the one or more particular RUs that are re-assigned.

In one embodiment, causing the one or more particular RUs to be reassigned at 306 may include configuring a backup DU component connection for each of the one or more particular RUs that are assigned to the particular DU component before it has failed in which each backup DU component connection is configured based on the service characteristics maintained in the service information and the particular failover rules identified in the service information that are associated with each of the one or more particular RUs that are reassigned.

In one embodiment, configuring a backup DU component connection for each of the one or more particular RUs may include configuring a backup-pair processing element endpoint on each of the one or more particular RUs such that the RUs can automatically utilize the backup-pair processing element endpoint configuration (e.g., automatically switch to using the backup-pair configuration, updating the name of the backup-pair configuration to reflect a primary pair configuration, etc.) upon determining a failure with the particular DU component.

In one embodiment, causing the one or more particular RUs to be reassigned at 306 may include configuring a processing element endpoint for each of the one or more other DU components to which each of the one or more particular RUs are reassigned. In one embodiment, causing the one or more particular RUs to be reassigned at 306 may include the management node notifying a CU-CP/UP component or components and the one or more other DU components of the plurality of DU components regarding reassignment of the one or more particular RU(s) to each of the one or more other DU components.

In some instances, the method may include utilizing a cell ID and/or spectral resources associated with the particular failed DU component for broadcasts associated with at least one RU of the one or more particular RU(s) that are reassigned to at least one DU component of the one or more other DU components. In still some instances, the method may include utilizing a current cell ID and/or spectral resources of at least one DU component of the one or more other DU components for broadcasts associated with at least one RU of the one or more particular RU that are reassigned to the at least one DU component.

Figure 4:
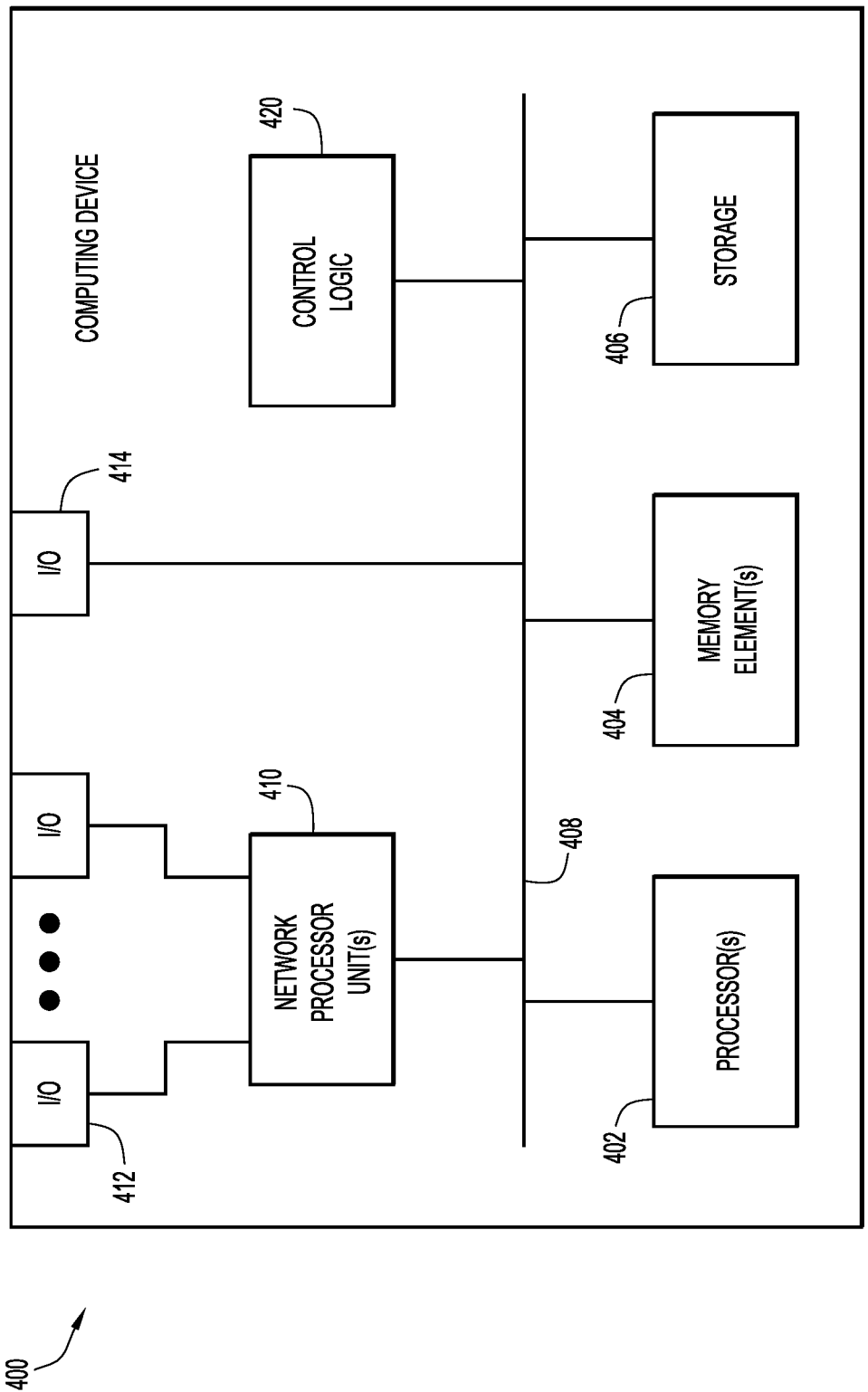
FIG. 4 is a hardware block diagram of a computing device that may perform functions associated with any combination of operations, in connection with the techniques depicted herein.

Referring to FIG. 4, FIG. 4 illustrates a hardware block diagram of a computing device 400 that may perform functions associated with operations discussed herein in connection with the techniques discussed herein. In various embodiments, a computing device, such as computing device 400 or any combination of computing devices 400, may be configured as any entity/entities as discussed for the techniques discussed herein in order to perform operations of the various techniques discussed herein, such as, for example, management node 140.

In at least one embodiment, computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device. Processor(s) 402 (e.g., hardware processor(s)) can execute any type of instructions associated with data to achieve the operations detailed herein. In one example, processor(s) 402 can transform an element or an article (e.g., data, information) from one state or thing to another state or thing. Any potential processors, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 (wired and/or wireless) to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s) and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, any other I/O port(s), and/or antenna(s)/antenna array(s) now known or hereafter developed. Thus, the network processor unit(s) 410 and/or network I/O interface(s) 412 may include suitable interfaces for receiving, transmitting, and/or otherwise communicating data and/or information in a network environment.

I/O interface(s) 414 allow for input and output of data and/or information (wired or wireless) with other entities that may be connected to computer device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein. In one embodiment, control logic 420 may include and/or overlap in any manner with failover logic as discussed for embodiments herein, such as failover logic 150.

For example, in at least one implementation, control logic 420 can include instructions that, when executed, cause processor(s) 402 to perform operations including maintaining, by a management node for a virtualized Radio Access Network (vRAN), service information for a plurality of distributed unit components for the vRAN, wherein the service information identifies, at least in part, service characteristics and failover rules for the plurality of distributed unit components in relation to a plurality of radio units for the vRAN; determining a failure of a particular distributed unit component of the plurality of distributed unit components, wherein one or more particular radio units are assigned to the particular distributed unit component prior to the failure; and reassigning the one or more particular radio units to one or more other distributed unit components of the plurality of distributed unit components based on the service characteristics maintained in the service information and particular failover rules identified in the service information that are associated with each of the one or more particular radio units that are re-assigned.

Figure 5:
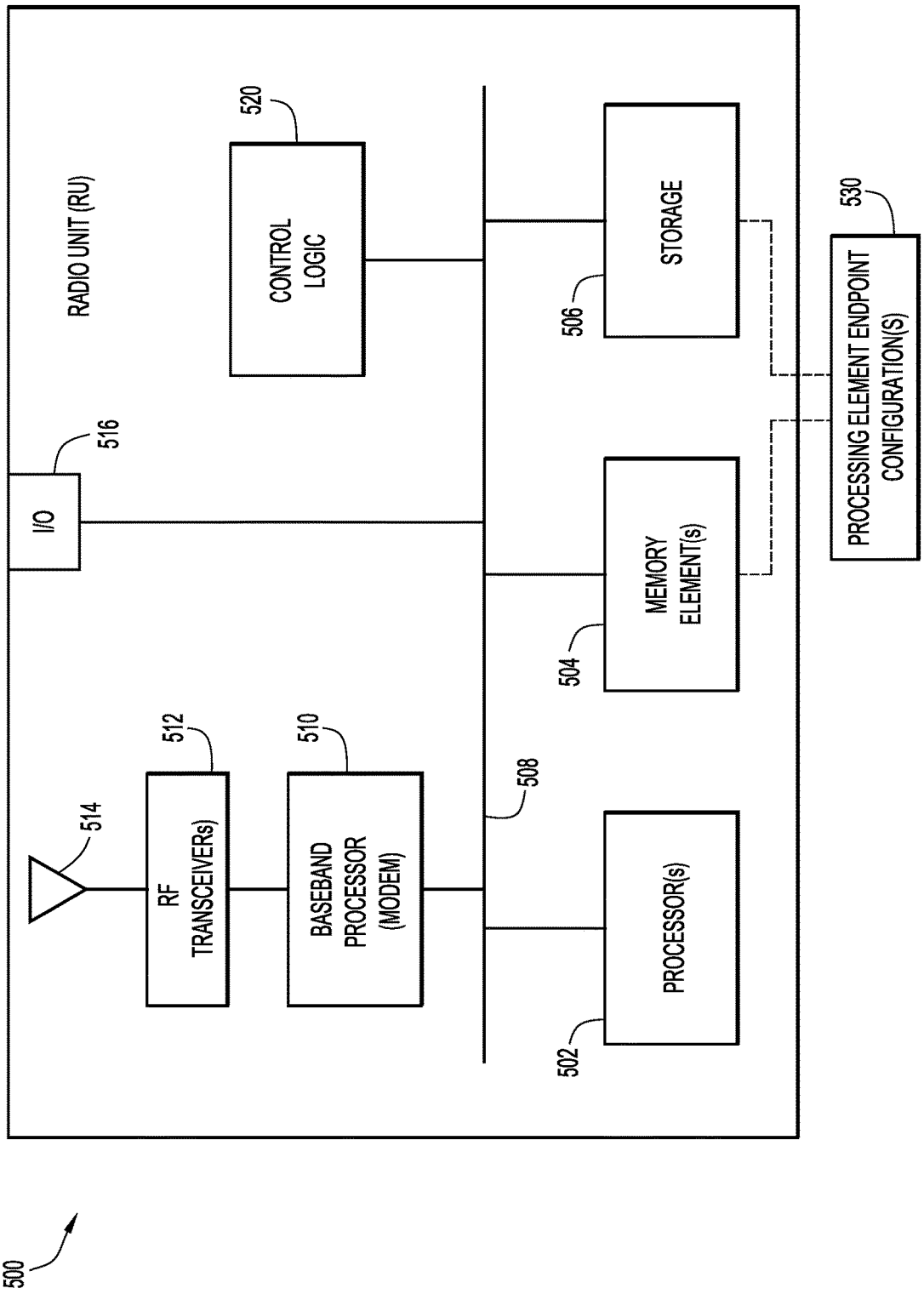
FIG. 5 is a hardware block diagram of a radio unit that may perform functions associated with any combination of operations, in connection with the techniques depicted herein.

Referring to FIG. 5, FIG. 5 illustrates a hardware block diagram of a radio unit (RU) 500 that may perform functions associated with operations discussed herein in connection with the techniques discussed herein. In various embodiments, an RU, such as RU 500 or any combination of RUs 500, may be configured as any of RUs 111, 112, 113, 121, 122, 123, 131, and 131 as discussed for the techniques discussed herein in order to perform operations of the various techniques discussed herein.

In at least one embodiment, RU 500 may include one or more processor(s) 502, one or more memory element(s) 504, storage 506, a bus 508, a baseband processor or modem 510, one or more radio RF transceiver(s) 512, one or more antennas or antenna arrays 514, one or more I/O interface(s) 516, and control logic 520. Also illustrated in FIG. 5, one or more processing element endpoint configuration(s) 530 may be stored in any combination of memory element(s) 504 and/or storage 506 (e.g., backup-pair processing element endpoint configuration(s), a primary-pair processing element endpoint configuration, etc.). In various embodiments, instructions associated with logic for RU 500 can overlap in any manner and are not limited to the specific allocation of instructions and/or operations described herein.

The one or more processor(s) 502, one or more memory element(s) 504, storage 506, bus 508, and I/O 516 may be configured/implemented in any manner described herein, such as described above at least with reference to FIG. 4. The RF transceiver(s) 512 perform RF transmission and RF reception of wireless signals via antenna(s)/antenna array(s)

514, and the baseband processor (modem) 510 performs baseband modulation and demodulation, etc. associated with such signals to enable wireless communications for RU 500.

In various embodiments, control logic 520, to perform operations, which can include, but not be limited to, providing overall control operations of RU 500; interacting with other entities, systems, logic, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Although not illustrated, it is to be understood that processing element endpoint configurations for one or more DU(s), such as DUs 110, 120, and 130, may also be configured via any combination of memory element(s) and/or storage configured for such DU(s).

The programs described herein (e.g., control logic 420/520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404/504 and/or storage 406/506 can store data, software, code, instructions (e.g., processor instructions), logic, parameters, combinations thereof, and/or the like used for operations described herein. This includes memory element(s) 404/504 and/or storage 406/506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer implemented method is provided that may include maintaining, by a management node for a virtualized Radio Access Network (vRAN), service information for a plurality of distributed unit components for the vRAN, wherein the service information identifies, at least in part, service characteristics and failover rules for the plurality of distributed unit components in relation to a plurality of radio units for the vRAN; determining a failure of a particular distributed unit component of the plurality of distributed unit components, wherein one or more particular radio units are assigned to the particular distributed unit component prior to the failure; and causing the one or more particular radio units to be reassigned to one or more other distributed unit components of the plurality of distributed unit components based on the service characteristics maintained in the service information and particular failover rules identified in the service information that are associated with each of the one or more particular radio units that are re-assigned.

In one instance, the method may include performing service measurements for the plurality of distributed unit components and the plurality of radio units for the vRAN, wherein maintaining the service information comprises populating values for the service characteristics based on the service measurements.

In various instances, the service measurements include: a current radio unit capacity for each of the plurality of distributed unit components; a current traffic usage for each of the plurality of distributed unit components; a current latency for each of one or more radio units assigned to each of the plurality of distributed unit components; and a current latency for each of one or more other radio units that are not assigned to each of the plurality of distributed unit components.

In at least one instance, the particular failover rules identify, at least in part, the one or more other distributed unit components to which the one or more particular radio units are to be reassigned. In at least one instance, the service information further identifies slice considerations indicating an order for reassigning the one or more particular radio units to the one or more other distributed unit components.

In one instance, causing the one or more particular radio units to be reassigned includes the management node notifying a central unit component and the one or more other distributed unit components of the plurality of distributed unit components regarding reassignment of the one or more particular radio units to the one or more other distributed unit components of the plurality of distributed unit components.

In one instance, the method may include utilizing a cell identifier of the particular distributed unit component for broadcasts associated with at least one radio unit of the one or more particular radio units that are reassigned to at least one distributed unit component of the one or more other distributed unit components. In one instance, the method may include utilizing a current cell identifier of at least one distributed unit component of the one or more other distributed unit components for broadcasts associated with at least one radio unit of the one or more particular radio units that are reassigned to the at least one distributed unit component.

In one instance, causing the one or more particular radio units to be reassigned to the one or more other distributed unit components includes configuring a backup distributed unit component connection for each of the one or more particular radio units that are assigned to the particular distributed unit component before it has failed and wherein each backup distributed unit component connection is configured based on the service characteristics maintained in the service information and the particular failover rules identified in the service information that are associated with each of the one or more particular radio units that are reassigned.

In one instance, the method may include determining updated service characteristics for the plurality of distributed unit components that have not failed; and load balancing one or more of the plurality of radio units among the plurality of distributed unit components that have not failed.

In one form, one or more non-transitory computer readable storage media encoded with instructions that, when executed by a processor, cause the processor to perform operations, comprising: maintaining, by a management node for a virtualized Radio Access Network (vRAN), service information for a plurality of distributed unit components for the vRAN, wherein the service information identifies, at least in part, service characteristics and failover rules for the plurality of distributed unit components in relation to a plurality of radio units for the vRAN; determining a failure of a particular distributed unit component of the plurality of distributed unit components, wherein one or more particular radio units are assigned to the particular distributed unit component prior to the failure; and causing the one or more particular radio units to be reassigned to one or more other distributed unit components of the plurality of distributed unit components based on the service characteristics maintained in the service information and particular failover rules identified in the service information that are associated with each of the one or more particular radio units that are re-assigned.

In one form, a system may be provided that may include at least one memory element for storing data; and at least one processor for executing instructions associated with the data, wherein executing the instructions causes the system to perform operations, comprising: maintaining, by a management node for a virtualized Radio Access Network (vRAN), service information for a plurality of distributed unit components for the vRAN, wherein the service information identifies, at least in part, service characteristics and failover rules for the plurality of distributed unit components in relation to a plurality of radio units for the vRAN; determining a failure of a particular distributed unit component of the plurality of distributed unit components, wherein one or more particular radio units are assigned to the particular distributed unit component prior to the failure; and causing the one or more particular radio units to be reassigned to one or more other distributed unit components of the plurality of distributed unit components based on the service characteristics maintained in the service information and particular failover rules identified in the service information that are associated with each of the one or more particular radio units that are re-assigned.

In summary, techniques herein may provide a vRAN system to recover from a DU failover to facilitate a high reliability 5G vRAN.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   maintaining, by a management node for a virtualized Radio Access Network (vRAN), service information for a plurality of distributed unit components for the vRAN, wherein the service information identifies, at least in part, service characteristics and failover rules for the plurality of distributed unit components in relation to a plurality of radio units for the vRAN, wherein the service characteristics are based on service measurements performed for the plurality of distributed unit components and the plurality of radio units for the vRAN and the service measurements comprise a current radio unit capacity and a current traffic usage for each of the plurality of distributed unit components, a current latency for each of one or more radio units assigned to each of the plurality of distributed unit components, and a current latency for each of one or more other radio units that are not assigned to each of the plurality of distributed unit components;
   determining a failure of a particular distributed unit component of the plurality of distributed unit components, wherein one or more particular radio units are assigned to the particular distributed unit component prior to the failure; and
   causing the one or more particular radio units to be reassigned to one or more other distributed unit components of the plurality of distributed unit components based on the service characteristics maintained in the service information and particular failover rules identified in the service information that are associated with each of the one or more particular radio units that are re-assigned.

2. The method of claim 1, wherein the particular failover rules identify, at least in part, the one or more other distributed unit components to which the one or more particular radio units are to be reassigned.

3. The method of claim 1, wherein the service information further identifies slice considerations indicating an order for reassigning the one or more particular radio units to the one or more other distributed unit components.

4. The method of claim 1, wherein causing the one or more particular radio units to be reassigned includes the management node notifying a central unit component and the one or more other distributed unit components of the plurality of distributed unit components regarding reassignment of the one or more particular radio units to the one or more other distributed unit components of the plurality of distributed unit components.

5. The method of claim 1, further comprising:
   utilizing a cell identifier of the particular distributed unit component for broadcasts associated with at least one radio unit of the one or more particular radio units that are reassigned to at least one distributed unit component of the one or more other distributed unit components.

6. The method of claim 1, further comprising:
utilizing a current cell identifier of at least one distributed unit component of the one or more other distributed unit components for broadcasts associated with at least one radio unit of the one or more particular radio units that are reassigned to the at least one distributed unit component.

7. The method of claim 1, wherein causing the one or more particular radio units to be reassigned to the one or more other distributed unit components includes configuring a backup distributed unit component connection for each of the one or more particular radio units that are assigned to the particular distributed unit component before it has failed and wherein each backup distributed unit component connection is configured based on the service characteristics maintained in the service information and the particular failover rules identified in the service information that are associated with each of the one or more particular radio units that are reassigned.

8. The method of claim 1, further comprising:
determining updated service characteristics for the plurality of distributed unit components that have not failed; and
load balancing one or more of the plurality of radio units among the plurality of distributed unit components that have not failed.

9. One or more non-transitory computer readable storage media encoded with instructions that, when executed by a processor, cause the processor to perform operations, comprising:
maintaining, by a management node for a virtualized Radio Access Network (vRAN), service information for a plurality of distributed unit components for the vRAN, wherein the service information identifies, at least in part, service characteristics and failover rules for the plurality of distributed unit components in relation to a plurality of radio units for the vRAN, wherein the service characteristics are based on service measurements performed for the plurality of distributed unit components and the plurality of radio units for the vRAN and the service measurements comprise a current radio unit capacity and a current traffic usage for each of the plurality of distributed unit components, a current latency for each of one or more radio units assigned to each of the plurality of distributed unit components, and a current latency for each of one or more other radio units that are not assigned to each of the plurality of distributed unit components;
determining a failure of a particular distributed unit component of the plurality of distributed unit components, wherein one or more particular radio units are assigned to the particular distributed unit component prior to the failure; and
causing the one or more particular radio units to be reassigned to one or more other distributed unit components of the plurality of distributed unit components based on the service characteristics maintained in the service information and particular failover rules identified in the service information that are associated with each of the one or more particular radio units that are re-assigned.

10. The media of claim 9, wherein the particular failover rules identify, at least in part, the one or more other distributed unit components to which the one or more particular radio units are to be reassigned.

11. The media of claim 9, wherein the service information further identifies slice considerations indicating an order for reassigning the one or more particular radio units to the one or more other distributed unit components.

12. The media of claim 9, wherein instructions, when executed by the processor, cause the processor to perform further operations, comprising:
determining updated service characteristics for the plurality of distributed unit components that have not failed; and
load balancing one or more of the plurality of radio units among the plurality of distributed unit components that have not failed.

13. A system comprising:
at least one memory element for storing data; and
at least one processor for executing instructions associated with the data, wherein executing the instructions causes the system to perform operations, comprising:
maintaining, by a management node for a virtualized Radio Access Network (vRAN), service information for a plurality of distributed unit components for the vRAN, wherein the service information identifies, at least in part, service characteristics and failover rules for the plurality of distributed unit components in relation to a plurality of radio units for the vRAN, wherein the service characteristics are based on service measurements performed for the plurality of distributed unit components and the plurality of radio units for the vRAN and the service measurements comprise a current radio unit capacity and a current traffic usage for each of the plurality of distributed unit components, a current latency for each of one or more radio units assigned to each of the plurality of distributed unit components, and a current latency for each of one or more other radio units that are not assigned to each of the plurality of distributed unit components;
determining a failure of a particular distributed unit component of the plurality of distributed unit components, wherein one or more particular radio units are assigned to the particular distributed unit component prior to the failure; and
causing the one or more particular radio units to be reassigned to one or more other distributed unit components of the plurality of distributed unit components based on the service characteristics maintained in the service information and particular failover rules identified in the service information that are associated with each of the one or more particular radio units that are re-assigned.

14. The system of claim 13, wherein the particular failover rules identify, at least in part, the one or more other distributed unit components to which the one or more particular radio units are to be reassigned.

15. The system of claim 13, wherein the service information further identifies slice considerations indicating an order for reassigning the one or more particular radio units to the one or more other distributed unit components.

16. The system of claim 13, wherein causing the one or more particular radio units to be reassigned includes the management node notifying a central unit component and the one or more other distributed unit components of the plurality of distributed unit components regarding reassignment of the one or more particular radio units to the one or more other distributed unit components of the plurality of distributed unit components.

17. The system of claim 13, wherein executing the instructions causes the system to perform further operations, comprising:
   utilizing a cell identifier of the particular distributed unit component for broadcasts associated with at least one radio unit of the one or more particular radio units that are reassigned to at least one distributed unit component of the one or more other distributed unit components.

18. The system of claim 13, wherein executing the instructions causes the system to perform further operations, comprising:
   utilizing a current cell identifier of at least one distributed unit component of the one or more other distributed unit components for broadcasts associated with at least one radio unit of the one or more particular radio units that are reassigned to the at least one distributed unit component.

19. The system of claim 13, wherein causing the one or more particular radio units to be reassigned to the one or more other distributed unit components includes configuring a backup distributed unit component connection for each of the one or more particular radio units that are assigned to the particular distributed unit component before it has failed and wherein each backup distributed unit component connection is configured based on the service characteristics maintained in the service information and the particular failover rules identified in the service information that are associated with each of the one or more particular radio units that are reassigned.

20. The system of claim 13, wherein executing the instructions causes the system to perform further operations, comprising:
   determining updated service characteristics for the plurality of distributed unit components that have not failed; and
   load balancing one or more of the plurality of radio units among the plurality of distributed unit components that have not failed.

* * * * *